Figure 1:
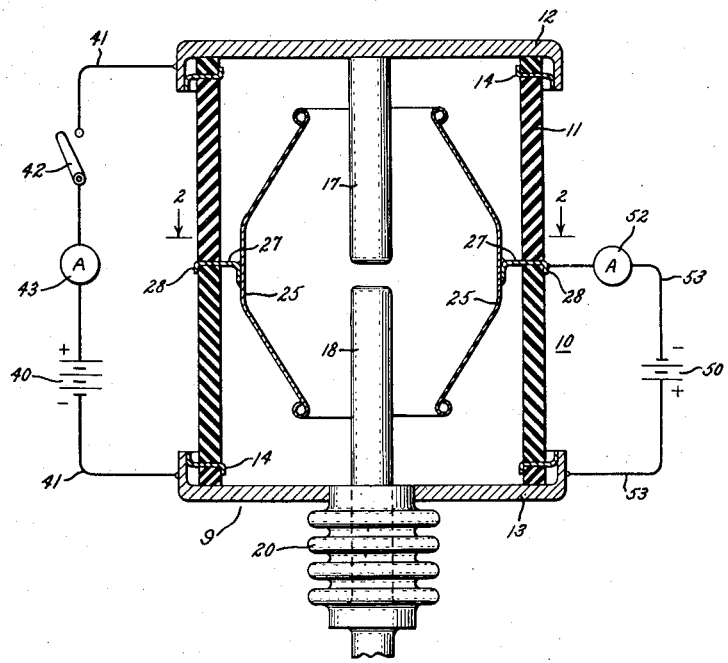

Dec. 16, 1958

T. H. LEE 2,864,998

PRESSURE MEASURING ARRANGEMENT FOR A VACUUM
CIRCUIT INTERRUPTER

Filed July 8, 1957

Inventor:
Thomas H. Lee,
by J. Wesley Haubner
His Attorney.

United States Patent Office 2,864,998
Patented Dec. 16, 1958

2,864,998

PRESSURE MEASURING ARRANGEMENT FOR A VACUUM CIRCUIT INTERRUPTER

Thomas H. Lee, Media, Pa., assignor to General Electric Company, a corporation of New York Application July 8, 1957, Serial No. 670,443

6 Claims. (Cl. 324—33)

This invention relates to an arrangement for measuring the degree of vacuum present within a vacuum circuit interrupter and, more particularly, within a vacuum circuit interrupter which is designed to operate with pressures in the neighborhood of $10^{-4}$ mm. of mercury or lower.

One prior proposal for measuring the degree of vacuum present in a vacuum interrupter involved determining the amount of voltage required to establish a spark breakdown between the separated electrodes of the interrupter. I have found that this scheme is not sufficiently accurate for measurements in the vacuum range which the present interrupter is intended to operate. I have found, for example, that breakdown voltage is essentially independent of pressure for pressures below $10^{-3}$ mm. of mercury for arcing gaps having a length such as contemplated for the present interrupters, say, for example a length of $\frac{1}{16}$ inch or greater.

A scheme which relies upon spark breakdown is therefore not sufficiently reliable for measuring pressures in the range of $10^{-4}$ mm. and lower, especially for arcing gaps of the type contemplated.

It has also been proposed to attach a conventional ionization gage to the interrupter to measure the degree of vacuum. These gages, however, are quite costly, and, moreover, few of them can withstand the high bake-out temperatures to which vacuum interrupters must be subjected in order to remove adsorbed gases. Ionization gages capable of successfully withstanding such temperatures are unduly expensive.

An object of the present invention is to provide a simple, accurate, and inexpensive arrangement for measuring the degree of vacuum present in a vacuum circuit interrupter.

Another object is to provide for a vacuum interrupter a vacuum measuring arrangement which requires no, or a minimum of, additional elements within the interrupter beyond those present in the interrupter without the vacuum measuring arrangement.

Another object is to provide a vacuum measuring arrangement which requires no additional seals, or at least a minimum number of additional seals, beyond those present in the interrupter without the vacuum measuring arrangement.

In carrying out my invention in one form, I measure the degree of vacuum within a vacuum circuit interrupter by utilizing the main operating elements of the interrupter itself as the principal parts of an ionization gage, thus eliminating the need for a separate vacuum measuring device, such as, for example, a separate ionization gage. I am particularly concerned with the general type of vacuum circuit interrupter which has separable electrodes defining an arcing gap therebetween and a metallic vapor-condensing shield surrounding this gap and normally electrically isolated from the two electrodes. In measuring the degree of vacuum within such an interrupter, I connect externally to the interrupter between its two spaced-apart main electrodes a source of voltage which is effective to produce an electron current between the two electrodes. The electrons emitted from the negatively charged main electrode collide with gas molecules inside the interrupter, and this produces positive ions at a rate dependent upon the pressure within the interrupter. The shield of the interrupter is maintained at a negative potential with respect to the negatively charged main electrode and, as a result, acts as a collector for the positive ions formed within the interrupter. An external circuit interconnects the shield and the negatively charged electrode, and positive ion current flows in this circuit at a rate dependent upon the rate at which the shield collects positive ions. Thus, by measuring this positive ion current, an indication of the pressure within the interrupter is obtained.

For a better understanding of my invention, reference may be had to the following specification taken in connection with the accompanying drawing, wherein:

Fig. 1 schematically illustrates one form of vacuum measuring arrangement for measuring the degree of vacuum present within a vacuum circuit interrupter.

Figure 2:
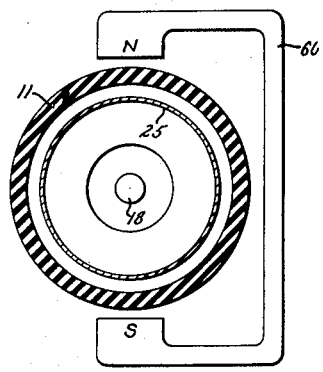

Fig. 2 illustrates a modification of the arrangement of Fig. 1. This view is taken along a section-line corresponding to the line 2—2 of Fig. 1.

Figure 3:
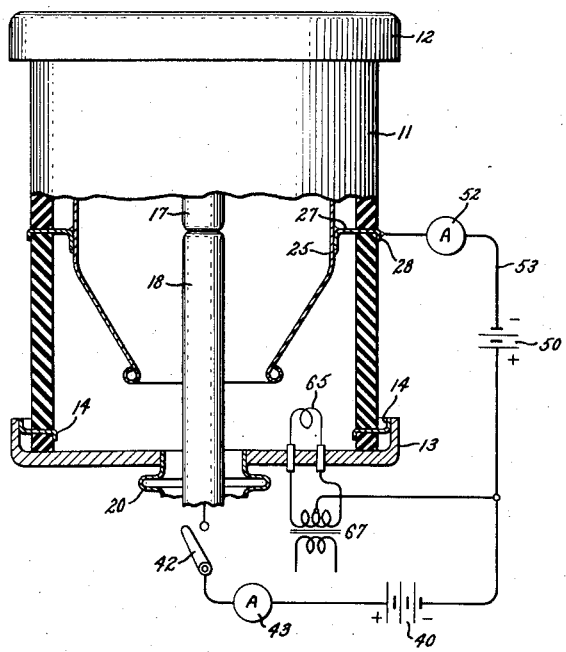

Fig. 3 schematically illustrates another modified form of vacuum measuring arrangement.

Referring now to Fig. 1, there is shown a vacuum interrupter 9 of the general type shown and claimed in Application S. N. 630,247, filed by D. W. Crouch and assigned to the assignee of the present invention. This interrupter 9 comprises a highly-evacuated envelope 10 formed from a cylindrical casing 11 of insulating material and a pair of metallic end caps 12 and 13 closing off the ends of the casing. Suitable seals 14 are provided between the end caps and the casing to render envelope 10 vacuum-tight.

Located within the envelope are a pair of separable electrodes, or rod contacts, 17 and 18 shown in the open-circuit position. These electrodes are formed of a suitable conductive material such as copper or molybdenum. The electrode 17 is a stationary electrode suitably united to the upper end-cap 12, whereas the electrode 18 is a movable electrode suitably mounted for vertical movement and projecting through an opening in the lower end-cap 13. A flexible metallic bellows 20 interposed between the end-cap 13 and the movable electrode 18 provides a seal about the movable electrode and allows for vertical movement thereof without impairing the vacuum inside the interrupter. The bellows 20 also provides a conductive connection between the movable electrode 18 and the end cap 13.

A suitable actuating device (not shown) is coupled to the lower end of the movable electrode 18 for driving it upwardly into contact with the upper electrode in order to close the interrupter and also for returning the electrode to its lower position shown in order to open the interrupter.

When the electrode is driven downwardly from its closed position to open the interrupter, a circuit-interrupting, or arcing, gap is established between the adjacent ends of the electrodes, and the resulting arc, though quickly extinguished, vaporizes some of the metal of the electrodes. In order to prevent this metallic vapor from condensing on the internal insulating walls of the casing 11, there is provided a metallic shield 25 which is of a generally-tubular configuration and extends along the length of the insulating casing 11 for substantial distances on opposite sides of the gap between the electrodes. In Fig. 1, all of the external electrical connections provided between the various elements of the interrupter are for the purpose of measuring the degree of vacuum inside the envelope 10, as will soon be described in detail. When the interrupter is in service, these connections are not present, and under such conditions the shield 25 is electrically isolated from both of the electrodes.

This electrical isolation is provided in the disclosed interrupter by relying upon the insulating casing 11 as a supporting structure for the shield 25. In this regard, the insulating casing 11 is formed from two coaxially-disposed glass or ceramic tubes joined together by a ceramic-to-metal or glass-to-metal seal which comprises an annular metallic disc 27 sealingly interposed between the adjacent ends of the tubes. At its inner periphery, this disc 27 is suitably united, as by welding, to the tubular shield 25 and, thus, supports the shield upon the insulating casing 11. The outer periphery of the disc 27 preferably extends radially outward slightly beyond the outer periphery of the casing 11, as shown at 28.

When an arc is established between the two main electrodes 17 and 18, the metallic vapor particles liberated from the electrode tips by arcing travel outwardly from the arcing gap. The shield 25, which surrounds the arcing gap, provides metallic surfaces which act to intercept and condense these vapor particles before they can reach the casing 11. Thus, the shield 25 acts to prevent the build-up of undesirable metallic coatings upon the internal insulating wall of the casing. For a complete description of this action, reference may be had to the aforesaid Crouch application.

The circuit interrupting ability of the vacuum interrupter 9 depends to an important extent upon whether the pressure within the envelope 10 is below about $10^{-4}$ mm. of mercury. For providing a reliable indication of whether the pressure is below this level, I have provided an inexpensive measuring arrangement which is constructed in accordance with the present invention and which will now be described. This measuring arrangement comprises a source of voltage, such as battery 40, connected in a circuit 41 extending between the two electrodes 17 and 18 of the interrupter externally to the envelope 10. The positive terminal of the battery 40 is connected to the electrode 17 and the negative terminal to the electrode 18, thus rendering the electrode 18 negative with respect to the electrode 17. In circuit with the battery between the two electrodes is preferably provided a switch 42 and a milli-ammeter 43 for measuring the flow of current through the circuit 41 when the switch 42 is closed.

Connected in a circuit 53 extending externally to the envelope 10 between the central shield 25 and the electrode 18 is an additional source of voltage, such as battery 50. This battery 50 has its negative terminal connected to the shield 25 and its positive terminal connected to the electrode 18 so as to render the shield 25 negative with respect to the electrode 18. A microammeter 52 connected in circuit with the battery 50 serves to indicate the amount of current flowing in the circuit 53. It will be noted that the conductor forming the external circuit 53 does not enter the envelope 10 but is merely connected to the outer periphery 28 of the sealing disc 27.

With the switch 42 closed, the voltage of battery 40 is effective to cause electrons to be emitted from the negatively charged electrode 18, and electron current therefore flows between the electrodes 18 and 17 across the gap therebetween. When these electrons collide with any gas molecules present within the envelope, positive ions are formed as a result of electrons being driven from the gas molecules by the collisions. Some of the positive ions are attracted to the negatively charged shield 25, which acts as a collector, and this produces a current in the circuit 53. This current, which is termed the positive ion current, is measured by means of the microammeter 52.

For a predetermined electron current between the electrodes 17 and 18 and a predetermined voltage between the shield 25 and electrode 18, a definite relationship exists between the positive ion current flowing through circuit 53 and the pressure within the interrupter. For interrupters of a given design, this data can be plotted on suitable calibration curves, and such curves can be referred to by a user of the interrupter in order to determine the pressure within the interrupter once he has obtained a measurement of the required electrical values.

By way of example, the following voltages can be suitably used in my disclosed measuring arrangement for providing an accurate indication of the pressure within the envelope 10. Assuming that the gap between the electrodes 17 and 18 is set at $\frac{1}{32}$ inch, then the terminal voltage of the battery 40 can be about 4000 volts and the terminal voltage of battery 50 can be about 200 volts.

It will be apparent from the above description that the measuring arrangement of Fig. 1 requires no elements within the interrupter beyond those which would be present in the absence of the measuring arrangement. So, in effect, the interrupter itself serves as an ionization gage, and the need for a separate ionization gage is entirely eliminated. Eliminating the need for a separate ionization gage is important not only because of the relatively high cost of such a separate gage but also because there is no need for the additional seals in envelope 10 which would be required to accommodate a separate gage. This further contributes toward reducing the cost of the interrupter and also helps to minimize the number of possible leakage sources, thereby contributing toward increased reliability of the interrupter.

The measuring arrangement of Fig. 1 can be rendered more sensitive by utilizing a magnet, such as shown at 60 in Fig. 2, for producing a magnetic field in the region of the gap between the electrodes 17 and 18. This magnetic field deflects the electrons as they are emitted from the cathode 18 and thus requires them to follow a much longer path in reaching the anode 17 than they would otherwise be required to follow. This increases the probability of collisions with the gas molecules present, and, as a result, the number of positive ions produced per electron at any given pressure is considerably greater than would be obtained without the magnetic field.

The magnet 60 of Fig. 2 is preferably of the permanent magnet type and comprises a pair of magnetically-opposite pole pieces located on diametrically opposite sides of the interrupter.

It is to be understood that, for most applications, this magnetic field is not necessary to the operation of my measuring arrangement but merely increases the sensitivity thereof. For some vacuum interrupters, it is not practical to utilize a magnet because of the configuration of the interrupter or the size of the magnet required. Thus, my measuring arrangement is advantageous in not generally requiring such a magnet for successful operation.

In some cases it may be desirable to obtain a measurement of the degree of vacuum present within an interrupter when it is in the closed position. The arrangement of Fig. 1 is not suited for such measurements because when the interrupter is closed, the two members 17 and 18 are in engagement and thus constitute only a single electrode, at least from a vacuum-measuring standpoint.

This problem can be overcome by relying upon an arrangement such as shown in Fig. 3, where elements corresponding to those of Fig. 1 have been given corresponding reference numerals. In the arrangement of Fig. 3, there is introduced into the envelope 10 an additional element 65 which preferably takes the form of a filament made of tungsten or some other metal capable of emitting electrons when heated. For heating this element 65 to effect the desired emission of electrons, a suitable current source, such as a filament transformer 67 is connected in circuit therewith. A battery 40 connected between the filament and the electrode 18 with its positive terminal connected to the electrode 18 renders the electrode 18 positive with respect to the filament. As a result, the electrode 18 is capable of serving as the anode and the filament 65 as the cathode of the vacuum-measuring arrangement.

The shield 25 is connected to the filament 65 through a circuit 53 which contains a battery 50 having its negative terminal connected to the shield to maintain the shield negative relative to the filament 65. The shield 25 is therefore capable of acting as a collector for positive ions in the same general manner as in Fig. 1.

Thus, when the switch 42 is closed and the filament 65 is heated by current supplied from the source 67, electron current flows between the electrodes 65 and 18 producing positive ion current in the circuit 53 in the same general manner as in Fig. 1. Measuring this positive ion current by means of a micro-ammeter provides an indication of the pressure within the interrupter in the same general manner as in Fig. 1.

By way of example, terminal voltages of about 200 volts are suitable for each of the batteries 40 and 50 relied upon in the arrangement of Fig. 3.

Although the arrangement of Fig. 3 requires an additional electrode as compared to that of Fig. 1, it has an advantage in that this additional electrode, filament 65, can be used as a pump for aiding in the maintenance of a high vacuum in the envelope 10. Tungsten, for example, when heated, acts as an efficient getter or clean-up agent for oxygen. Accordingly, the tungsten filament 65 when heated acts to clean-up any oxygen present in the envelope 10, thus aiding in maintaining a high vacuum therein. It will therefore be seen that the filament 65 is capable of performing an important function in the interrupter apart from its function as a source of electrons in the vacuum-measuring arrangement. Examples of other metals from which the filament 65 can suitably be formed are molybdenum and tantalum.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In an arrangement for measuring the degree of vacuum present inside a vacuum circuit interrupter of the type comprising an evacuated envelope containing a pair of electrodes having a spaced-apart position for defining an arcing gap therebetween and a metallic vapor-condensing shield surrounding the arcing gap and normally electrically isolated from said electrodes: the combination with said interrupter of means for applying a voltage between said electrodes sufficient to cause electrons to be emitted from one of said electrodes, means for maintaining said metallic shield at a negative potential relative to said electron-emitting electrode whereby said shield acts as a collector for positive ions formed by collision of said electrons with gas molecules inside said interrupter, an external circuit interconnecting said shield and said electron-emitting electrode for transmitting positive ion current resulting from the formation of said positive ions, and current measuring means for measuring said positive ion current.

2. The arrangement of claim 1 in combination with magnetic means providing a magnetic field which deflects said electrons and lengthens the required path of travel for said electrons in comparison to the length of the required path in the absence of said magnetic field.

3. In an arrangement for measuring the degree of vacuum present inside a vacuum circuit interrupter of the type comprising an evacuated envelope containing separable main electrodes defining an arcing gap therebetween and a metallic vapor-condensing shield surrounding the arcing gap and normally electrically isolated from said main electrodes: an auxiliary electrode disposed within said envelope, voltage applying means for maintaining said auxiliary electrode at a negative potential with respect to one of said main electrodes, means for heating said auxiliary electrode to provide a flow of electrons from said auxiliary electrode to said one main electrode, means for maintaining said metallic shield at a negative potential relative to said auxiliary electrode whereby said shield acts as a collector for positive ions formed by collision of said electrons with gas molecules inside said envelope, and an external circuit interconnecting said shield and said auxiliary electrode for transmitting positive ion current resulting from the formation of said positive ions, and current measuring means for measuring said positive ion current.

4. The arrangement of claim 3 in which said auxiliary electrode is formed of a material capable of acting as a getter for gases within said interrupter.

5. In an arrangement for measuring the degree of vacuum present inside a vacuum circuit interrupter of the type comprising an evacuated envelope containing a pair of conductive elements having a spaced-apart position for defining an arcing gap therebetween and a third conductive element normally electrically isolated from said other conductive elements: means for applying a voltage between two of said conductive elements of said interrupter sufficient to cause electrons to be emitted from one of said elements, means for maintaining the remaining one of said elements at a negative potential relative to said electron-emitting element whereby said remaining element acts as a collector for positive ions formed by collision of said electrons with gas molecules inside said envelope, and an extenal circuit interconnecting said remaining element and said electron-emitting element for transmitting positive ion current resulting from the formation of said positive ions, and current measuring means for measuring said positive ion current.

6. In an arrangement for measuring the degree of vacuum present inside a vacuum circuit interrupter of the type comprising an evacuated envelope containing a circuit interrupting electrode located adjacent an arcing gap, a metallic vapor-condensing shield surrounding the arcing gap and normally electrically isolated from said electrode, and an additional electrode: means for applying a voltage between said additional electrode and said circuit interrupting electrode sufficient to cause electrons to be emitted from one of said electrodes, means for maintaining said metallic shield at a negative potential relative to said electron-emitting electrode whereby said shield acts as a collector for positive ions formed by collision of said electrons with gas molecules inside said interrupter, and an external circuit interconnecting said shield and said one electrode for transmitting positive ion current resulting from the formation of said positive ions, and current measuring means for measuring said positive ion current.

References Cited in the file of this patent

UNITED STATES PATENTS

| | | |
|---|---|---|
| 1,334,143 | Dushman | Mar. 16, 1920 |
| 1,754,180 | Sabbah | Apr. 8, 1930 |